(12) United States Patent
Schmitz et al.

(10) Patent No.: US 11,875,179 B2
(45) Date of Patent: Jan. 16, 2024

(54) APPARATUS AND METHODS FOR CONVERTING STATUS INFORMATION FROM INTERNET OF THINGS (IOT) DEVICES INTO ACTION ANNOUNCEMENTS FOR TASK-BASED GROUPS

(71) Applicant: ReAct Now GmbH, Norderstedt (DE)

(72) Inventors: Martin Schmitz, Großalmerode (DE); Manuel Tessloff, Hamburg (DE)

(73) Assignee: ReAct Now GmbH, Nordestedt (DE)

( * ) Notice: Subject to any disclaimer, the term of this patent is extended or adjusted under 35 U.S.C. 154(b) by 0 days.

(21) Appl. No.: 17/206,736

(22) Filed: Mar. 19, 2021

(65) Prior Publication Data
US 2021/0294637 A1 Sep. 23, 2021

Related U.S. Application Data (60) Provisional application No. 62/992,244, filed on Mar. 20, 2020.

(51) Int. Cl.
G06F 9/46 (2006.01)
G06F 9/4401 (2018.01)
(Continued)

(52) U.S. Cl.
CPC ............ *G06F 9/466* (2013.01); *G06F 9/4411* (2013.01); *G06N 20/00* (2019.01); *G16Y 10/75* (2020.01); *G16Y 20/10* (2020.01); *G16Y 20/20* (2020.01)

(58) Field of Classification Search
CPC ........... H04W 4/70; H04W 4/38; H04W 4/02; H04L 67/60; H04L 67/52; H04L 67/025;
(Continued)

(56) References Cited

U.S. PATENT DOCUMENTS 9,053,506 B2 6/2015 Van Nest et al.
9,286,771 B2 3/2016 Llewellyn, Jr.
(Continued)

FOREIGN PATENT DOCUMENTS

WO WO-2019117735 A1 6/2019

OTHER PUBLICATIONS

International Search Report and Written Opinion dated Jun. 9, 2021, for International Application No. PCT/EP2021/057138, 18 pages.
(Continued)

*Primary Examiner* — Chun Kuan Lee
(74) *Attorney, Agent, or Firm* — COOLEY LLP (57) ABSTRACT

In some embodiments, a method can include receiving a signal representing a first status of a peripheral device. The method can further include identifying an action based on the first status of the peripheral device, each user from a subset of users being predesignated to perform the action. The method can further include sending, to a set of user devices, a signal representing the action. The method can further include receiving, from at least one user device, a signal representing an acceptance of the action. The method can further include sending, to each remaining user device from the set of user devices, a signal indicating the acceptance of the action by a different user device and a signal indicating that the action has been performed by the user and that causes the first status of the peripheral device to be changed to a second status of the peripheral device.

21 Claims, 5 Drawing Sheets

(51) Int. Cl.

| | | |
|---|---|---|
| *G06N 20/00* | (2019.01) | |
| *G16Y 10/75* | (2020.01) | |
| *G16Y 20/10* | (2020.01) | |
| *G16Y 20/20* | (2020.01) | |
| *H04L 67/025* | (2022.01) | |
| *H04L 67/52* | (2022.01) | |
| *H04L 67/60* | (2022.01) | |
| *H04W 4/38* | (2018.01) | |
| *H04W 4/70* | (2018.01) | |
| *H04L 67/12* | (2022.01) | |
| *H04W 4/02* | (2018.01) | |

(58) Field of Classification Search
CPC ........ H04L 67/12; G06F 9/466; G06F 9/4411; G06Q 30/0241; G16Y 20/10; G16Y 20/20; G16Y 10/75; G06N 20/00
USPC .......................................................... 710/19
See application file for complete search history.

(56) References Cited

U.S. PATENT DOCUMENTS

| | | | |
|---|---|---|---|
| 9,418,344 | B2 | 8/2016 | Fulkerson |
| 9,467,843 | B1* | 10/2016 | Smith ................... H04W 8/065 |
| 9,781,247 | B1* | 10/2017 | Gadepalli ............. H04W 4/023 |
| 10,046,235 | B2 | 8/2018 | Leu |
| 10,081,525 | B2 | 9/2018 | High et al. |
| 10,127,588 | B2 | 11/2018 | Longino |
| 10,499,190 | B1* | 12/2019 | Douglas, Jr. ............ H04W 4/20 |
| 2007/0250370 | A1 | 10/2007 | Partridge et al. |
| 2008/0301296 | A1 | 12/2008 | York |
| 2012/0264395 | A1* | 10/2012 | Bradburn ............ H04M 3/5233 |
| | | | 379/265.12 |
| 2016/0028660 | A1* | 1/2016 | Weishaupl .............. H04L 63/10 |
| | | | 709/206 |
| 2017/0053461 | A1* | 2/2017 | Pal ........................ G06V 20/597 |
| 2017/0249577 | A1* | 8/2017 | Nishikawa ............. G06Q 10/06 |
| 2017/0372594 | A1* | 12/2017 | Paulin .................. G08B 25/016 |
| 2019/0311440 | A1 | 10/2019 | Bishop |
| 2020/0334470 | A1* | 10/2020 | Abeykoon ............. G06V 10/96 |

OTHER PUBLICATIONS

Author Unknown, "Crew Introduces New Service for Purposeful and Organized Team Communications that Keeps Everyone on the Same Page", BusinessWire, published May 4, 2017, retrieved online at https://www.businesswire.com/news/home/20170504005542/en/Crew-Introduces-New-Service-Purposeful-Organized-Team, on Sep. 29, 2023, 5 pgs.

Author Unknown, "Customer Stories. Discover how our employee app works, from Speakap customers themselves. Read the stories, watch the Speakap customer testimonial videos, and find out how some of the biggest brands connect and engage their frontline employees.", Speakap, published Jul. 4, 2019, retrieved online at: https://www.speakap.com/en/speakap-customers, on Sep. 29, 2023, 5 pgs.

Author Unknown, "Everything in one place. Everyone connected. Find out how OurPeople boosts team communication, and keeps everyone up-to-date and on-task.", OurPeople, published Dec. 13, 2019, retrieved from the Internet at https://www.ourpeople.com/en-gb/product, on Sep. 28, 2023, 9 pgs.

Author Unknown, "Take your stores to a new level of efficiency with retail scheduling software", Deputy, published 2019, retrieved online at https://www.deputy.com/industry/retail, on Sep. 29, 2023, 17 pgs.

* cited by examiner

Receive, from a peripheral device, a signal representing a first status of the peripheral device  201

Identify an action based on the first status of the peripheral device, each user from a subset of users being predesignated to perform the action  202

Send, to a set of user devices, a signal representing the action, each user device from the set of user devices being uniquely associated with a user from the subset of users  203

Receive, from at least one user device from the set of user devices, a signal representing an acceptance of the action in response to the signal representing the action  204

Send, to each remaining user device from the set of user devices, a signal indicating the acceptance of the action by a different user device  205

Receive, from the at least one user device, a signal indicating the action has been performed by the user  206

Send, to the peripheral device, a signal that indicates the action has been performed and that causes the peripheral device to change the first status of the peripheral device to a second status of the peripheral device in response to receiving the signal that indicates the action has been performed  207

APPARATUS AND METHODS FOR CONVERTING STATUS INFORMATION FROM INTERNET OF THINGS (IOT) DEVICES INTO ACTION ANNOUNCEMENTS FOR TASK-BASED GROUPS

CROSS REFERENCE TO RELATED APPLICATION

This application claims priority to and the benefit of U.S. Patent Application No. 62/992,244, filed Mar. 20, 2020 and titled "APPARATUS AND METHODS FOR CONVERTING STATUS INFORMATION FROM INTERNET OF THINGS (IOT) DEVICES INTO ACTION ANNOUNCEMENT FOR TASK-BASED GROUPS," which is incorporated herein by reference in its entirety.

TECHNICAL FIELD

The present disclosure relates to the field of information and communication technology adapted for the internet of things (IoT), and in particular to methods and apparatus for converting status information from IoT devices into action announcement for task-based groups.

BACKGROUND

Some known methods for processing status information of devices around us remain manual, which can be time-consuming. Thus, a need exists for information and communication technology systems and methods that can effectively process status information from devices.

SUMMARY

In some embodiments, a method can include receiving a signal representing a first status of a peripheral device. The method can further include identifying an action based on the first status of the peripheral device, each user from a subset of users being predesignated to perform the action. The method can further include sending, to a set of user devices, a signal representing the action. The method can further include receiving, from at least one user device, a signal representing an acceptance of the action. The method can further include sending, to each remaining user device from the set of user devices, a signal indicating the acceptance of the action by a different user device and a signal indicating the action that has been performed by the user and that causes the first status of the peripheral device to be changed to a second status of the peripheral device.

DETAILED DESCRIPTION

Non-limiting examples of various aspects and variations of the embodiments are described herein and illustrated in the accompanying drawings.

One or more embodiments described herein generally relate to apparatus and methods for content management among Internet of Things (IoT) devices. The content management system and methods described herein can automatically identify a large number of actions to be performed and route and/or process a large number of action requests (e.g., 10 action requests, 50 action requests, 100 action requests, 500 action requests, 1000 action requests, 5000 action requests, and/or the like) to a large number of users (e.g., 2 users, 3 users, 4, users, 5 users, 10 users, 50 users, 100 users, 500 users, 1000 users, 5000 users, any number of users between two aforementioned numbers of users and/or the like) in a significantly expedited fashion.

Figure 1:
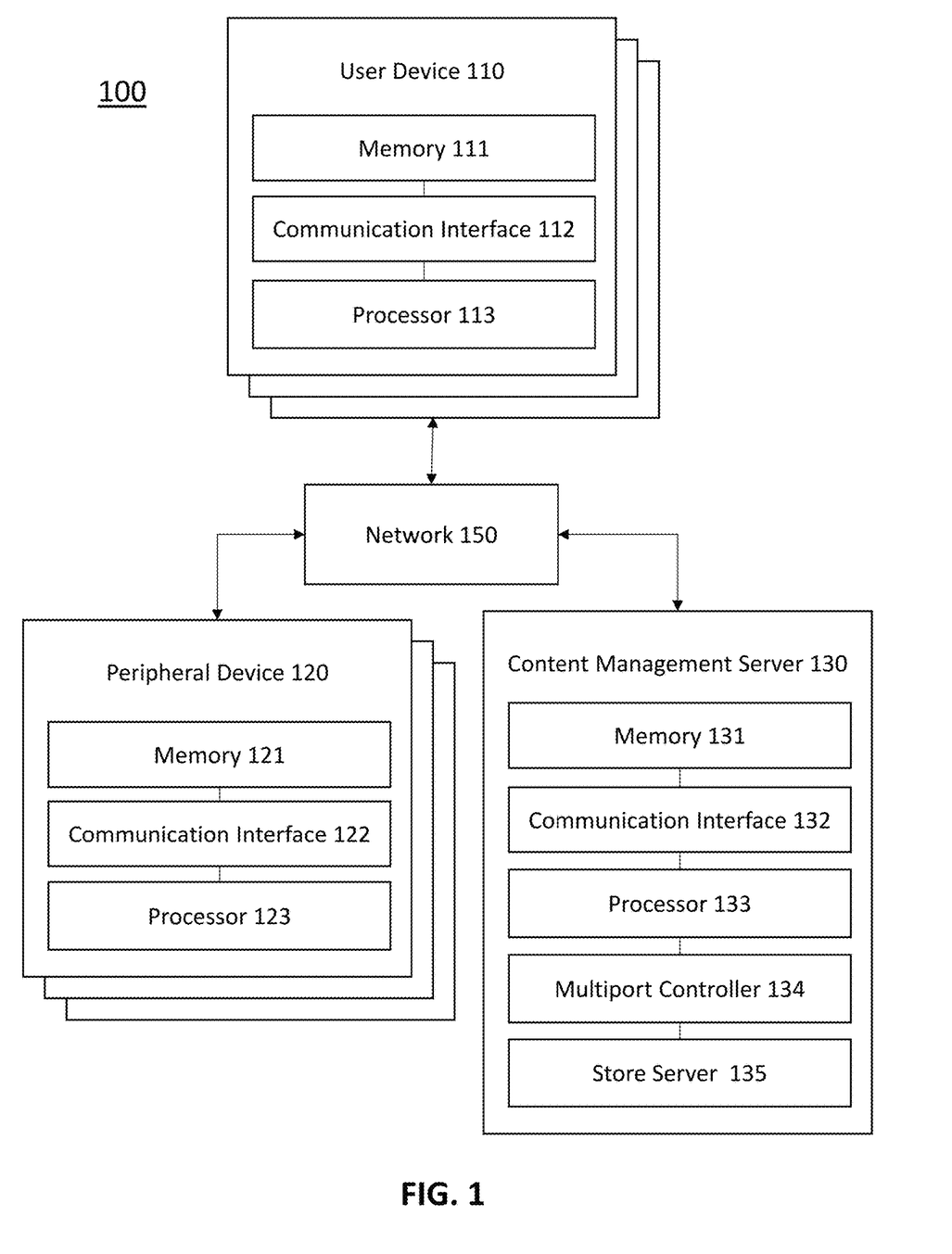
FIG. 1 is a block diagram of a content management system, according to an embodiment.

FIG. 1 is a block diagram of a content management system 100, according to an embodiment. The content management system 100 (also referred to as a 'call to action platform') can include a set of user devices 110, a set of peripheral devices 120 (also referred to as 'internet of things devices' or 'IoT device'), and a content management server 130 that can automatically convert status information sent from the set of peripheral devices 120 into an action (e.g., an action announcement) for the set of user devices 110. The set of user devices 110, the set of peripheral devices 120, and the content management server 130, each can be/include a hardware-based computing device(s) and/or a multimedia device(s), such as, for example, a computer(s), a desktop device(s), a laptop(s), a tablet(s), a smartphone(s), a smartwatch(es), and/or the like. The content management system 100 can offer a wide range of software services (also referred to as 'modular software service' or 'applications'). The software services can be implemented in the set of user devices 110, the set of peripheral devices 120, and the content management server 130. In some instances, the software services and applications can be combined and supplemented as desired and therefore can be tailored to a user's (e.g., a store manager using the content management server 130) needs.

Each user device from the set of user devices 110 includes a memory 111, a communication interface 112, and a processor 113. The memory 111 (e.g., a random-access memory (RAM), a hard drive, a flash drive, and/or the like) of the set of user devices 110 can store data (e.g., status information, a chat, a schedule, and/or the like), and/or code that includes instructions to cause the processor to perform one or more processes or functions (e.g., a code to send an indication of acceptance of an action). The communication interface 112 (e.g., a network interface card (NIC), a Wi-Fi (ID transceiver, a Bluetooth® transceiver, and/or the like) can be a hardware component that facilitates data communication between each user device from the set of user devices 110 and other devices (e.g., the set of peripheral devices 120, the content management server 130, and/or the like). The processor 113 (e.g., a central processing unit (CPU), a graphics processing unit (GPU), and/or the like) can be, for example, a hardware-based integrated circuit (IC) or any other suitable processing device configured to run or execute a set of instructions or codes. The set of user devices 110 can send data (e.g., a signal representing an indication of location of a user device) to the set of peripheral devices 120 and/or the content management server 130, and receive data (e.g., an action, an status of a peripheral device) from the set of peripheral devices 120 and/or the content management server 130.

Each peripheral device from the set of peripheral devices 120 includes a memory 121, a communication interface 122 and/or a processor 123 that are structurally and/or functionally similar to the memory 111, the communication interface 112 and/or the processor 113. Each peripheral device from the set of peripheral devices 120 can send data (e.g., a signal representing a status of that peripheral device) to the set of user devices 110 and/or the content management server 130 and receive data (e.g., a signal indicating that an action has been performed) from the set of user devices 110 and/or the content management server 130 and receive data.

The content management server 130 can include a compute device medium(s) suitable for data storage, a compute device medium(s) suitable for data communication, and/or a compute device medium(s) suitable for data processing. For example, the content management server 130 can include a database, a processing unit, a router, and/or the like. In some implementations, the content management server 130 can include, for example, a network of electronic memories (e.g., memories of a database in a data center), a server(s), a network attached storage(s), and/or the like. The content management server 130 can include a memory 131, a communication interface 132, and a processor 133 that are structurally and/or functionally similar to the memory 111, the communication interface 112 and the processor 113. The content management server 130 can store and operate software services that can be implemented (e.g., using Node.JS or Angular.JS applications) on the set of user devices 110 and/or the set of peripheral devices 120 as appropriate for a given software service. In some instances, the processor of the content management server 130 can be used to configure (e.g., set default settings and default schedules, update setting and schedules based on data received from the set of user devices 110 and/or the set of peripheral devices 120) the software services.

In some configurations, when a connection to a specialized hardware (e.g., a loudspeaker) or physical interfaces is not desired, a software service can be stored and executed on a server of the content management server 130 (e.g., stored and executed on a Linux server or Windows server). In some configurations, when a set of connections of the set of peripherals 120, audio hardware, and/or a set of specialized hardware is desired, the content management server 130 can use a multiport controller 134 and/or a store server (SE) 135.

The multiport controller 134 (also referred to as 'RMC') is a hardware component that is used to control the set of peripheral devices 120. Due to a more complex design in RMC 134 considerably more possibilities for control exists (e.g., a control of cash register light pole). In some instances, the RMC 134 can be implemented on a hardware-based device such as a personal computer (PC) that can be operated with a Linux operating system or a Windows® operating system and on which various Java® services run. The PC can communicate with various other hardware components in the content management system 100, for example, to map a control of light emitting diodes (LEDs), cash register barriers, and/or the like. In some instances, the RMC 134 can have an 8-channel audio interface that is connected to the PC and can play up to 8 audio signals individually. For example, a Java® services audio manager, an audio player, and/or the like can be used to address the audio interface. In some instances, the RMC 134 can include a receiver for radio signals that can be triggered by radio transmitters connected to potential-free contacts at various supermarket peripherals from the set of peripheral devices 120. For example, a Java® service can process incoming signals, interpret the incoming signals at the receiver, and subsequently trigger preconfigured actions. In some instances, the RMC 134 can include a general purpose input/output (GPIO) interface that can process potential-free physical switch signals. A Java® service can process the incoming signals, interpret them, and subsequently trigger preconfigured actions. In some instances, the RMC 134 can include a relay interface with 4 outputs, each output can be used to switch up to 4 loads. In some instances, the RMC 134 can include a radio interface (not to be confused with the receiver for radio signals described above). The radio interface can supply an audio signal from an external radio source (e.g. Motorola® radios) and receives another audio signal that can be fed into the radio circuit. A Java® service can control the radio interface and also trigger, for example, a Push-To-Talk' function of the external radio source via a relay located in the radio interface.

The RMC 134 can include a set of check out area management system (also 'KLS') interfaces (not shown). The KLS interfaces can, for example, control a set of signal LEDs at different cash registers or check a status a set of cigarette carriers at a cash register. In some instances, a Java® service can control a status of point-of-sale (POS) peripherals from the set of peripheral devices 120. The POS peripherals can be equipped with another Java® service to process signals from the cash register and can be controlled via a touchscreen and receive a command(s) from a POS staff to open or close a POS peripheral from the POS peripherals.

The store server 135 (SE) can be a modular hardware that can be used to control the set of peripheral devices 120. The SE can use one or more single-board computers on which various services can be installed. A single board computer can be operated, for example, with a Debian Linux. In some instances, the SE can use a compute device (e.g., personal computer (PC)). Depending on a complexity of the SE, several compute devices can used to control various hardware interfaces. Various input/output (TO) modules can be also available such as, for example:

GPO6—an output module for controlling 6 relays;
GPIO83—an IO module for controlling 3 relays and 8 physical potential-free inputs; and
GPIO16—an input module for controlling 16 physical potential-free inputs.

The set of user devices 110, the set of peripheral devices 120, and the content management server 130 can communicate data (e.g., an indication of location, a status of a peripheral device, an indication of acceptance of an action, and/or the like) via a network 150. The network 150 can be or include, for example, a digital telecommunication network of servers and/or compute devices. The servers and/or compute devices of the network can be connected via one or more wired or wireless communication networks (not shown) to share resources such as, for example, data storage and/or computing. The wired or wireless communication networks between servers and/or compute devices of the network 150, the set of user devices 110, the set of peripheral devices 120, and/or the content management server 130 can include one or more communication channels (e.g., a radio frequency (RF) communication channel(s), a fiber optic commination channel(s), and/or the like). The network 150 can be and/or include, for example, the Internet, an intranet, a local area network (LAN), and/or the like.

A software service from the software services can be offered as individual and independent service, or it can be used by a combination with other software services to complement each other. In some implementations, the content management server 130 can store (e.g., in memory 131) and execute (e.g., at processor 133) the software services as sets of instructions. In some implementations, the content management server 130 can include specialized hardware (e.g., a communication server, a check out area management system, a representational state transfer (REST) Gateway; not shown) to operate the software services. An application ('app'; not shown) to access the software service can be installed on the set of user devices 110 and/or the set of peripheral devices 120 as appropriate for a given software service. The software services can be, include or operate on hardware such as:

- A communication server (also 'Comm Server') that can coordinate a communication between the set of user devices 110 and/or the set of peripheral devices 120 (e.g., an Android device(s)) running a communicator application (also 'Communicator App');
- Check out area management system (also "KLS") or server (hereafter "KLS Server") that can optimize the processes at a store (e.g., a supermarket) checkout;
- KLS user interface: point-of-sale (POS) can control, for example, a message sent to a user device, a status of a peripheral device, and/or the like directly from POS screens instead of hardware at the cash registers;
- Audio service: a music(s) and/or a playlist(s) can be synchronized in a large number of different audio zones and can be played in a time-controlled manner;
- Ad service: playback of an audio advertising clip(s) according to a pre-defined schedule or dynamically determined schedule in different audio zones;
- Task scheduler: activation of certain actions at specified time periods (e.g., pager messages to groups or audio announcements based on an action often performed in the mornings);
- Radio integration: an audio announcement(s) can be fed directly into radio systems, e.g. from Motorola or Quail, to inform employees about tasks to be completed;
- Multiport service: can trigger an action(s) by physical contacts (e.g., triggering an action based on a manipulation of an input port, a change in a status of a relay, a merchandise holder was operated, and/or the like);
- REST Gateway: can trigger an action via a software interface;
- Reverse vending machine (RVM) service: RVMs report their status by triggering actions (e.g., via a cloud service or a local connection to RVMs);
- Anti-theft service: integration of safety barriers (e.g., an Electronic Article Surveillance (EAS) antennas), with which alarms can be translated into discrete and silent actions; and
- Log Analyzer: text data can be read live from log files and can generate trigger for actions.

Depending on the application, one or more of the aforementioned software services can be installed on a server (e.g., a local server such the content management server 130 or an external server) in a user's branch or store.

The software services mentioned above can be written in computer instructions/codes. Examples of computer instructions/codes include, but are not limited to, instructions/codes written to be processed or produced by a compiler, a web service, an interpreter, and/or the like. For example, software services can be implemented using Python programming language, Java® programming language, JavaScript® programming language, C++ programming language, JavaScript® Object Notation (JSON), and/or other programming languages, packages, and software development tools.

The communicator application can include/perform a set of functions including: a function for triggering an action, a function for recording an announcement, a function for recording an audio message for a group or individual, a function for receiving audio messages from other users, a function for receiving pager actions, a function for a pause, and/or the like. A description and availability scenario for each function are provided in the below table:

| Function | Description | Availability |
| --- | --- | --- |
| Triggering an action | Pressing one of the tile icons triggers an action after a short message is displayed explaining what this action will do. If the action includes a pager message, the original sender will receive feedback on whether their request was accepted by an individual or completely rejected by all recipients. | If no actions are configured by the user, no action will be displayed. |
| Record an Announcement | Tapping an announcement icon allows the user to record a spoken message for up to 30 seconds. Record an audio message of up to 30 seconds and send it to a user group or individual user. | Can be enabled/disabled on a per-user basis. |
| Record an audio message for a group or individual | The recipient can accept or reject the incoming message. Accepting a message leads to the possibility to record a reply. The original sender receives the reply and is | Can be enabled/disabled on a per-user basis. |

| Function | Description | Availability |
|---|---|---|
| | able to re which allows audio messages to be sent back and forth between users. If all recipients reject the audio message, the original sender is informed that all recipients have rejected his message. Can be enabled/disabled on a per-user basis. | |
| Receive audio messages from other users | As listed above. Can be enabled/disabled on a per-user basis to prevent the user from appearing in a list of potential audio recipients. | Can be enabled/disabled on a per-user basis. |
| Receive Pager Actions | If devices or other users send pager messages to a group of recipients and the current recipient is a member of that group. | Can be enabled/disabled on a per-user basis. |
| Pause | The user is able to enter pause mode for a predefined period of time. During the pause, the user is not able to receive messages and requests and is shown as "on pause" in the recipient list. | Available at any time |

An installer for the communicator application, for example, can be obtained from a public app store (e.g., Google Play®). In some implementations, the communicator application can be registered such that it may not be usable by an unauthorized user unless the user has access to a registration code, and/or has access to an authorized and secured wireless network. In some implementations, the communicator application can be registered and/or accessed by a mobile device management (MDM) software in the set of user devices 110 and/or the set of peripheral devices 120 by providing, for example, an Android Package Kit (APK) in the MDM. The APK is an example of a data format to distribute and deploy the communicator application. The MDM can include, for example, software for centralized and remote management of the set of user devices 110 and/or the set of peripheral devices 120. Such centralized and remote management can, for example, perform or control installing software on the set of user devices 110 and/or the set of peripheral devices 120, and/or defining control settings on the set of user devices 110 and/or the set of peripheral devices 120.

The KLS can, for example, enable cashiers to control various functions at cash registers. The KLS can enable communication with other users (a store employees) and/or control cash register peripherals. The KLS server (not shown in FIG. 1) can communicate, via the content management server 130, with various software services running on POS PCs (not shown in FIG. 1) and with the various hardware-based POS peripherals (not shown in FIG. 1). A cash register control system can include a graphical user interface (GUI). The GUI, for example, can be divided into two portions: a fund portion and a control portion. By tapping on cash register symbols, a cash register can be opened or closed by a user. In some instances, a request can be sent by one or more users to open an additional cash register for operating, and the one or more users can be alerted by an acoustic signal that the additional cash register is to be opened. The cash register control system can include a store manager call button that can trigger an announcement (e.g., played on a speaker of a store) to call the store manager to the cash register. At the same time the cash register LED can be switched to blink (e.g., a blue/green blink). In some instances, the cash register control system can be operatively coupled to and control (e.g., open or close) a cigarette carrier relay and/or a cash register barrier relay. To do so, a signal can be sent to the content management server 130 to control the corresponding peripheral device (e.g., a cigarette carrier relay and/or a cash register barrier) centrally. The cash register control system can include additional buttons to set the cash register to a pause mode or to hold it as a so-called anchor cash register.

The audio service can control playback of audio files for a set of audio zones (e.g., eight audio zones within a given store). Audio zones can be determined based on a peripheral device(s), a user(s), and/or a customer(s) in a physical area within a store. For example, the set of audio zones an include a checkout area audio zone, an employee-only audio zone, and/or the like. A music playlist can be managed in the content management server 130. At the content management server 130, a set of audio files can be uploaded and compiled into playlists. The audio service can receive a configuration via the content management server 130 and get the audio files from a file server (now shown in FIG. 1). The audio files can be then stored locally in the set of user devices 110, the set of peripheral devices 120, and/or the content management server 130. Audio players can then access the files and play them via a speaker (not shown) at a scheduled time. For this purpose, the audio players can receive information/schedule from an audio manager about which title to play at what time. Because the audio players can be assigned to different audio zones, it is possible that different playlists are assigned to different audio players.

Playlists can include a number of titles, each available in different styles of music that is appropriate for a given department/section of a store (e.g., wine departments, fruit & vegetable areas, cosmetics area, and/or the like). A variety of music tracks can be played back in different audio zones. Each music piece in the playlist has been developed or edited in such a way that there should be no unpleasant acoustic effects in zone transitions, as the audio zones merge smoothly into each other. For example, the playlist can play a Jazz music in zone A and a Country music (not a genre of music significantly different than the Jazz music; e.g., a Trance music) in Zone B next to Zone A. The playlists can be configured to specify a time frame between a start time and an end time for the playlist. Even if the total length of the playlist exceeds this time frame, the playlist can be played between the start time and the end time so that the playlist is cut short (i.e., not all songs on the playlist are played). In some instances, by setting a shuffle function, different tracks can be played on different days in the time frame. By combining different playlists that play at different times of day, different music styles can be played at different times of day. Optionally any audio files can be generated as repeating loops in the content management server 130. This can be used, for example, to fill a parking lot with birdsong or to play a gentle wind noise in a fresh food department.

Announcements can also be played back in different audio zones, so that certain announcements, for example, can only be heard in the checkout area, while others can be heard on sales floor or in a warehouse. Such assignments of time zones can be defined in the content management server 130. In some instances, while announcements are being played, any music playing at that time can temporarily faded out. Announcements can be initiated, for example, by certain events interpreted by the software services. Such events can be, for example, a received radio signal or a closing of a potential-free contact (also known as volt free or dry contacts). The content management server 130 can also be used, for example, to configure specific announcements that are triggered at specific times. For example, every day, shortly before closing time, an announcement can be triggered on the sales floor to inform customers that the store is about to close. In addition to pre-recorded announcements, announcements can be recorded by a user(s) directly via the communicator application and played back in the overall market. The playlists can have commercial breaks between them. A set of times for the commercial breaks can be defined in the content management server 130. In some instances, a day can be divided into segments (e.g. 8:00 am to noon, noon to 4:00 pm, 4:00 pm to 8:00 pm, and/or the like). Advertising clips can be defined for the commercial breaks in the segments. If different clips fall at the same time due to the programming of advertising intervals, the audio service can automatically adjust the clips and/or audio files one after the other to produce an effect of an advertising block. In some instances, audio files that are no longer used can be automatically removed from the set of user devices 110, the set of peripheral devices 120, and/or the content management server 130 after a pre-set period of time.

To connect the set of peripherals 120 (also referred to as 'Internet of Things (IoT) peripherals') to the content management server 130, physical interfaces ("GPIO") and/or logical interfaces ("REST Gateway") can be used. Hardware interfaces of the multiport controller (RMC) 134 or store server (SE) 135 can be interpreted by a Java® service and trigger configurable audio announcements or other actions. The REST Gateway can allow an integration of external software to trigger actions. For example, a defined software interface can be used to trigger promotions that inform about the status of store peripherals and/or request action. The REST Gateway includes a callback mechanism that can be used to receive the result of an action and, if necessary, initiate further steps if an action was not successful (that is, if all recipients rejected the action).

In use, a set of sensors (not shown) can measure a set of characteristics of a peripheral device from the set of peripheral devices 120 to generate a set of sensor values. The peripheral device from the set of peripheral devices 120 identifies a first status of the peripheral device based on the set of sensor values. For example, the status of the peripheral device 120 can indicate a sensor value that is lower than a predetermined threshold (e.g., a thermal sensor of a refrigerator can indicate a temperature of −20 Celsius while the refrigerator is set operate at −5 Celsius). The peripheral device 120 then sends a signal representing the first status of the peripheral device to the content management server 130. The content management server 130 receives the signal representing a first status of the peripheral device from the peripheral device 120 and identifies an action based on the first status of the peripheral device.

The action can be defined in (or at) the content management server 130 and can include an indication of performing one or any combination of a pager event (e.g., sending a text to the set of users 110), an audio event (e.g., making an announcement), a physical switching events (e.g., turning a blinking light on), and/or the like. The action can be pre-designated to be performed by a subset of users. The content management server 130 then send a signal representing the action to the set of user devices 110, each uniquely associated with a user from the subset of users. In some instances, each user device 110 from the set of user devices can send a signal representing an indication of location of that user device 110 to the content management server 130. In some instances, the content management server 130 can associate one or more roles from a set of roles with the user in response to receiving the signal representing the indication of location of a user device 110. The subset of users and/or the set of user devices 110 associated with the subset of users can therefore be determined based on the action, the peripheral device 120, and/or the set of roles.

When a user of a user device 110 from the set of user devices accept the action (e.g., by clicking or tapping on an accept button on a graphical user interface (GUI) of the user device), the user device 110 can send a signal representing the acceptance of the action to the content management server 130. In response to receiving the signal representing the acceptance of the action, the content management server 130 can send, to each remaining user device 110 from the set of user devices, a signal indicating that the action was accepted by a different user device 110. In some instances, however, an action may require two or more users to accept the action (e.g., an action due to a large spill or leak, lifting a heavy box, and/or any action requires two or more individuals to be accomplished). In such circumstances, the content management server 130 can wait until the required two or more users accept the action before sending a signal indicating that the action was accepted by two or more users. In some instances, the content management server 130 can facilitate a chat instance between the set of user devices 110 to coordinate a response(s) to the action. In some configurations, once the required number of user(s) (one user, two user, 5 users, 10 users, 50 users, and/or the like) accept the action, the set of user device(s) 110 can remove/delete the chat instance. In some configurations, the set of users can decide when to leave the chat instance (e.g., by clicking 'leave' on the GUI of the set of user devices 110). Once only one user from the set of users remains in the chat instance, the chat instance is removed/deleted from the set of user devices 110.

Once the action is complete, the user device (or the two or more user device) from the set of user device 110 can send, to the content management server 130, a signal (or signals) indicating the action has been performed. The content management server 130 can receive the signal indicating the action has been performed by the user and send, to the peripheral device 120, a signal that indicates the action has been performed. The peripheral device 120 receives the signal sent from the content management server 130 that indicates the action has been performed, and thus change the first status of the peripheral device 120 to a second status of the peripheral device 120. In some instances, the second status of the peripheral device 120 can be evaluated by the set of sensors.

In one example, the first status of the peripheral device 120 can be determined based on a first temperature (e.g., 60 Celsius) measured by a thermal sensor of the peripheral device 120 (e.g., an oven) while the peripheral device 120 is set to operate at a second temperature (e.g., 100 Celsius). The action can be defined and broadcasted/sent, as described above, such that at least a user from the subset of users associated to a role related to adjusting a temperature of the peripheral device 120 perform the action. Once the user confirms performing the action, the thermal sensor can be notified to measure a temperature of the peripheral device 120 after the action has been performed. The peripheral device 120 can confirm that the temperature of the peripheral device is at or close to the second temperature at which the peripheral device 120 was set to operate.

In some instances, the set of sensors can include a first type of sensor and a second type of sensor. The first type of sensor and the second type of sensor, each can be/include an acoustic sensor, an optical sensor, a radio frequency (RF sensor), a magnetic sensor, a thermal sensor, a humidity sensor, a gyroscope, an accelerometer, and/or the like. In some instances, the set of sensor values can include a first sensor value recorded at a first time and a second sensor value recorded at a second time after the first time. The first sensor value and the second sensor value can be indicative of a sensor value trend and the peripheral device 120 can identify the first status of the peripheral device 120 based on the sensor value trend.

In some instances, the set of peripheral devices 120 can include a store peripheral device(s), a supermarket peripheral device(s), a cash register peripheral device(s), a reverse vending machine peripheral device(s), a security gate peripheral device(s), a self-checkout peripheral device(s), a cooling system monitoring peripheral device(s), a smart trashcan peripheral device(s), a shopping cart station peripheral device(s), an automatic door peripheral device(s), a backing oven peripheral device(s), a smart shelf peripheral device(s), a photo printing peripheral device(s), a cooling system peripheral device(s), a cigarette holder peripheral device(s), and/or any other suitable peripheral device. Given the wide range of types of peripheral device used in the content management system 100, the set of user devices 110, the set of peripheral devices 120, and/or the content management server 130, each can be or include special hardware. For example, the special hardware can be used to control a checkout traffic lights, to select a radio transmission signal(s), to switch a relay. In some instances, however, there may also be content management system 100 configurations that are based exclusively on the software services (software modules).

In some implementations, various status reports can be generated by the set of peripheral devices 120 and sent, via the content management server 130, to the set of user devices 120. For example, the status reports can include:
Security gates
    Security gates inform a security personal when an alarm is triggered.
    Product security shelves inform a security personal when a shelf is manipulated.
Self-Checkout
    Machine reports to personal
        When error occurs.
        When assistance, e.g., for age verification is required.
    Feedback from personal to machine
        Age verification is correct—machine can continue.
Cooling System Monitoring
    Cooling machines report the following status messages
        Door open.
        Temperature is to high—probably to many products.
        Temperature is to high—machine has problem.
Smart Trash Cans
    Trashcan send message at 80% full level.
Shopping Cart Station
    Shopping cart station sends message if less than 5 carts are left.
    Shopping cart stations send message if a station is 95% full.
Automatic Doors
    Send message if door opens during times were not many staff is in store to order more staff.
Backing Ovens
    Backing oven notifies when correct temperature is reached.
    Backing oven notifies when 2 minutes backing time is left.
    Backing oven notifies when backing is ready.
Smart Shelves
    Smart shelves notify if only 2 products are left.
    Smart shelves notify if out of stock.

Figure 2:
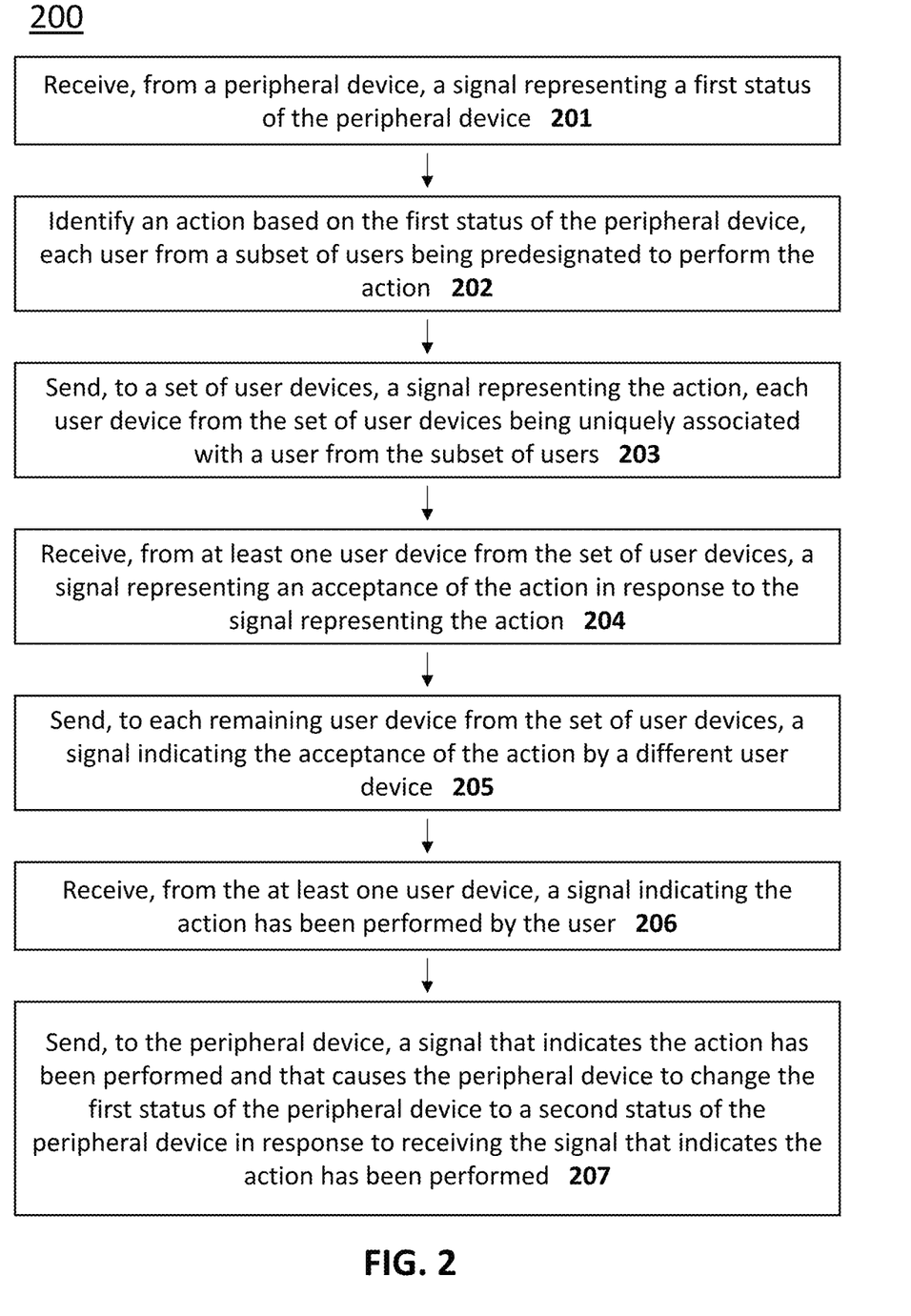
FIG. 2 is a flowchart of a method of communicating status information of a peripheral device between a set of user devices using a content management server, according to an embodiment.

FIG. 2 is a flowchart of a method of communicating status information of a peripheral device between a set of user devices using a content management server, according to an embodiment. In some implementations, a content management server (such as the content management server 130 as shown and described with respect to FIG. 1) can be used to perform the method 200. At 201, a signal representing a first status of the peripheral device is received from a peripheral device (such as peripheral device 120 shown and describe with respect to FIG. 1, such as e.g., a cash register, a self-checkout, a cooling system, a backing oven, a photo printing and/or the like). In some instances, the peripheral device controlled via a signal interface such as, for example, a wireless signal interface, a general-purpose input/output (GPIO) interface, a relay-based interface, a radio interface, and/or the like.

At 202, an action is identified based on the first status of the peripheral device, each user from a subset of users being predesignated to perform the action. In some instances, an artificial intelligence model can be executed to (a) receive the first status of the peripheral device and (b) identify the action. The artificial intelligence can include for example, a decision tree model, a neural network model, and/or the like, that can be trained using a training dataset. The training dataset can include a set of indications of status of peripheral devices, each associated to an appropriate action (determined by a supervisor).

At 203, a signal representing the action is sent to a set of user devices (such as the user devices 110 as shown and described with respect to FIG. 1). Each user device from the set of user devices is uniquely associated with a user from the subset of users. In some instances, one or more roles can be associated to each user from the subset of users based on a set of locations (e.g., a global positioning system (GPS) data, a location status set by each user, and/or the like) associated with the subset of users. The subset of users can be designated to perform the action based on the one or more roles associated with each user from the subset of users.

At 204, a signal representing an acceptance of the action in response to the signal representing the action can be received from at least one user device from the set of user devices. In some instances, an audio file can be played in at least one location associated with the at least one user from the subset of users, in response to the signal representing the action. In some instances, a text can be sent to at least the subset of users in response to the signal representing the action. In some instances, a relay of the peripheral device can be opened or closed in response to the signal representing the action. At 205, a signal indicating the acceptance of the action by a different user device is sent to each remaining user device from the set of user devices. When the user of the user device performs the action, the user and/or the peripheral device can send a signal to the content management server that the action has been performed. At 206, a signal indicating the action has been performed by the user can be received from the at least one user device.

At 207, a signal that indicates the action has been performed and that causes the peripheral device to change the first status of the peripheral device to a second status of the peripheral device can be sent to the peripheral devices in response to receiving the signal that indicates the action has been performed.

In some instances, the method 200 can optionally include determining an audio zone for the peripheral device. For example, the audio zone can be determined based on the peripheral device type, the store type, a location of the peripheral device, and/or the like. The audio zone can be associated with a playlist (e.g., a list of music, a list of songs, a list of audio advertisement, and/or the like). The playlist can be played via a speaker associated with the audio zone.

Figure 3:
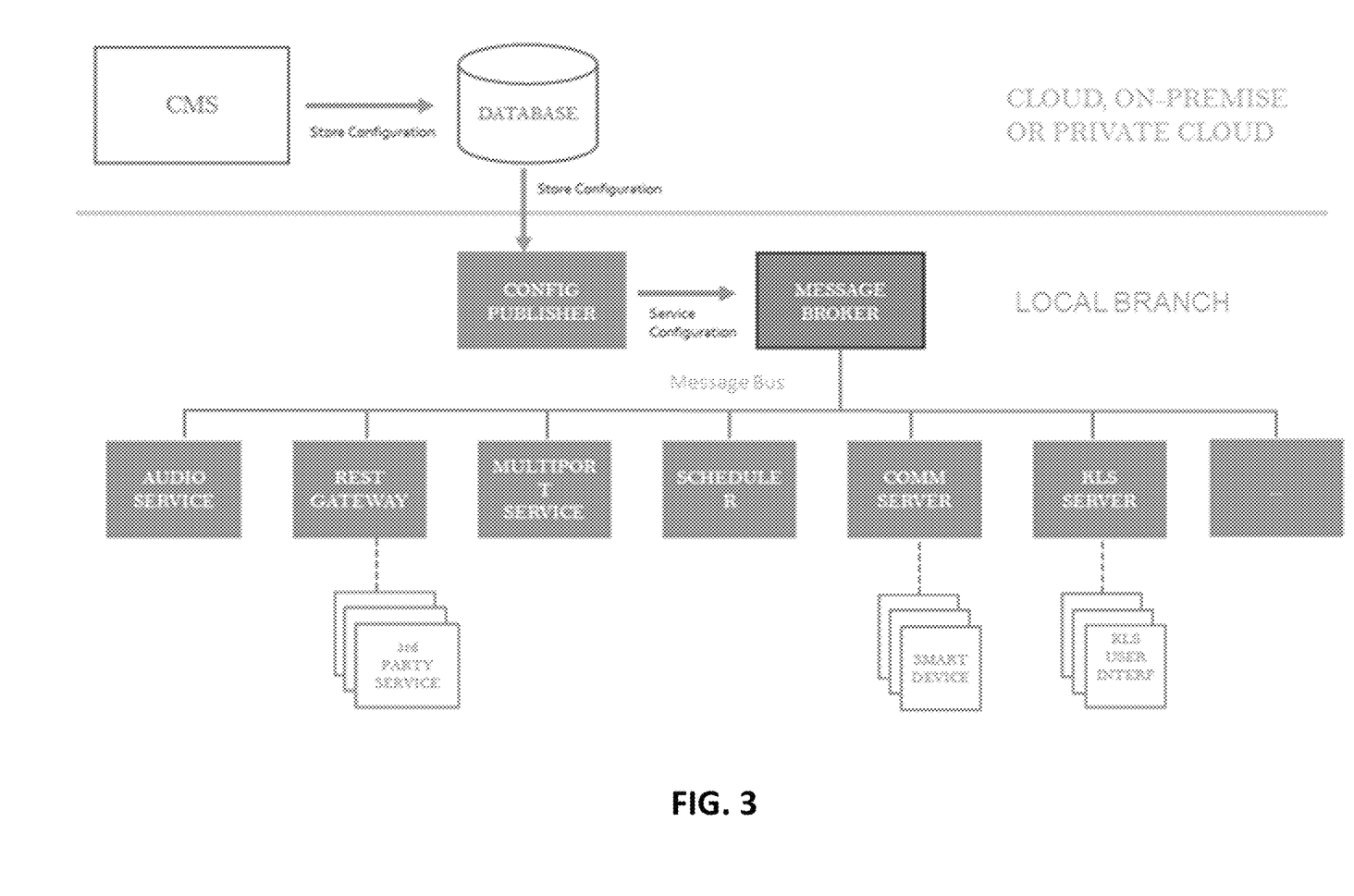
FIG. 3 is a block diagram showing a method of operating a content management system, according to an embodiment.

FIG. 3 is a system block diagram showing a method of operating a content management system, according to an embodiment. The content management system (similar to the content management system 100 as shown and described with respect to FIG. 1) can have a backend portion and a frontend portion. The backend portion of the content management system can include, for example, a database and a content management server ("CMS"). The CMS can include, for example, a Node.JS application, a Mongo (No-SQL) database, and a CMS web application that can work as an Angular.JS Single-Page Application in common browsers. The database can store templates for configuration of several stores, the affiliation of stores to templates, as well as the actual configurations of the stores. The CMS can control user access to templates, manages media files (music and announcements) and transforms the configuration of stores when changes are made to templates. To control access to templates, the CMS can be integrated into the customer's lightweight directory access protocol (LDAP) system. Configurations and media files can be distributed to the stores via a storage server.

The backend portion of the content management system can be implemented in a public cloud (e.g., Amazon Web Services (AWS®), Microsoft Azure®, Google Cloud®, and/ or the like), a private cloud, or on premise of a customer (such as a retail store). The backend portion of the content management system is operatively coupled to a frontend of the content management system, for example, by a wired connection, a wireless connection, by a network (not shown), etc. The frontend portion of the content management system can be implemented by a compute device such as a server, personal computer, and/to etc. such as the SE/RMC discussed above (in description of FIG. 1). The frontend portion of the content management system can include a configuration publisher (also 'Config Publisher'), a message broker, and the one or more of software services shown in the figure and implemented by separate a hardware device(s), separate software, and/or a combination thereof. In some implementations, the configuration publisher can be software that normalizes and adapts various aspects of the content management system capabilities to a given location (e.g., a retail store). Such normalization and adaptation can relate, for example, to aspects of an audio service such as a playable playlist produced by the scheduler to include advertising blocks within the playlist, different playlists spread over the day combined into one playlist, etc. An output of the configuration publisher can be provided to the message broker, which can be/include, for example, a message queuing telemetry transport (MQTT) message broker that routes messages over a message bus to a destination software service such as the audio service, REST Gateway, etc. The message broker thus can ensure that messages/ information for a particular software service are properly sent to the intended software service. The message bus can also be used to allow communications between various software services. For example, the multiport service can recognize the triggering of the physical switch and then can determine which action(s) is to be triggered in response and then send a message(s) over the message bus to the appropriate software service (e.g., the KLS Server, the Comm Server, the audio service, and/or the like) to take that action.

Figure 4:
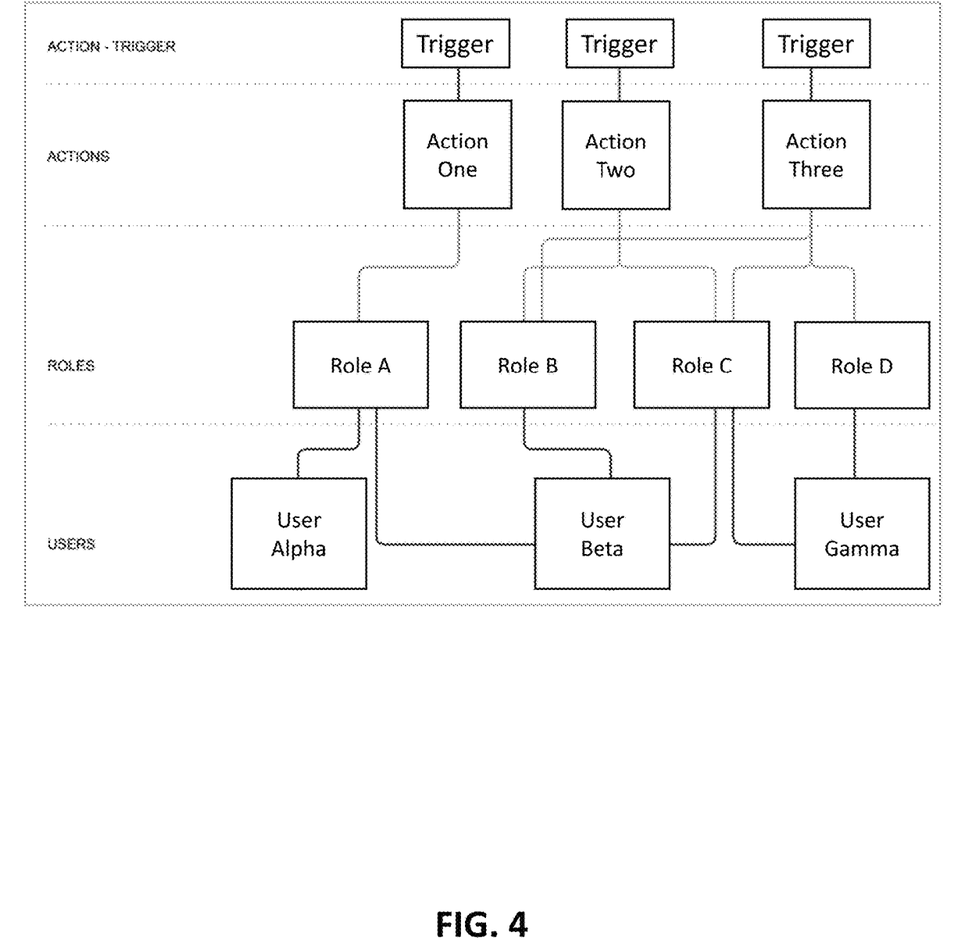
FIG. 4 is a block diagram showing a method of designating users to perform an action and forwarding of messages to the users, according to an embodiment.

FIG. 4 is a block diagram showing a method of designating users to perform an action and forwarding of messages to the users, according to an embodiment. In some implementations, a content management server (such as the content management server 130 as shown and described with respect to FIG. 1) can be used to implement the method. In some instances, a user who logs into one of the applications (also 'software services') of the content management server using a user device (e.g., a user device from the set of user devices 110 of FIG. 1) can be assigned to any number of roles based on a location (e.g., a global positioning system (GPS) data) of the user. (An action can be triggered, for example, by a peripheral device from the set of peripheral devices 120 and via a content management server 130 as shown and described with respect to FIG. 1). A set of conditions that can trigger and action include, for example, a bottle table is x % full, a crate belt is x % full, a container for plastic or cans is x % full, a printer needs paper, a machine is stopped, and/or the like.

As shown in FIG. 4, in one example, Action One can be a pager action that sends a text to all members of role A. Because user Alpha is a member of role A, the user Alpha will receive the pager message. Because user alpha is the only member of role A group, user alpha is the only user who will receive the pager message. In another example, Action Two is configured to target roles B and C. Because user beta is a member of roles A, B and C, the user beta will receive the pager message due to membership in roles B and C. In addition, because user gamma is a member of roles C and D, user gamma will also receive the pager message due to membership to role C. In another example, Action Three is configured to target roles B, C and D. User gamma is a member of roles C and D. Therefore, user gamma will receive the pager message. User beta will also receive the pager message due to membership to roles B and C. User alpha, however, will not receive the pager message in this example.

In some instances, an action may involve (or possibly require) two or more users to be performed. For example, two or more users can be assigned to cleaning a spill. In a large spill event in a section, the content management server (e.g. using an artificial intelligence analyzing images recorded by a camera of the section) and/or a supervisor user of the section can trigger an action that involve (or require) a threshold number of users (e.g., two users, five users, etc.) to accept the action. The content management server can send a message to a subset of user predesignated to cleaning spills and wait the threshold number of users to accept the action before sending messages to the remaining users from the subset of users that the action has been accepted.

The action can be triggered via a physical switch or via a software. In one example, a trigger for an action may be a physical switch connected to an IoT device (e.g., implemented on a Raspberry Pi®). In some instances, the action can be triggered by tapping a button on a GUI that accesses a software service/application using an application programming interface (API). A user that has a permission to trigger actions (e.g., a supervisor) can be logged into a user device (e.g., a tablet). In some implementations, each user can have a permission to trigger one or more actions. User devices can include a Java® program library (also called 'XInterface') that allows a user of those devices to trigger (via a content management server).

In some instances, a service tablet (e.g., assigned to a specific peripheral device(s)) can be configured to allow only one action to be triggered. In some instances, each tablet used at a cash register can log in with a specific user assigned to that cash register. In some instances, a user of a point-of-sale (POS) operator may be permitted to trigger more than one action. In some instances, a scheduler can be used to trigger a particular action on a regular basis and log the results of the action.

In some instances, there can be three possible outcomes from triggering the action including:
- One user (if a respective number of users is needed for the action, the respective number of users) can answer the message with 'accept'. In response to accepting the action, a signal indicating acceptance of the action can be communicated to the sender, a subset of users assigned to a role relevant to the action, and/or all other users to inform that the request has been accepted and subsequently processed.
- All recipients answer with 'reject'. In response to rejecting the action, a signal indicating rejection of the action can be communicated to the sender and/or a Master User (e.g. a supervisor). In response, the sender and/or the Master User can trigger (or set to automatically trigger) a subsequent action.
- None of the users is online. In response to receiving an indication that none of the users is online, a signal indicating rejection of the action can be communicated to the sender and/or a Master User (e.g. a supervisor). In response, the sender and/or the Master User can trigger (or set to automatically trigger) a subsequent action.

Figure 5:
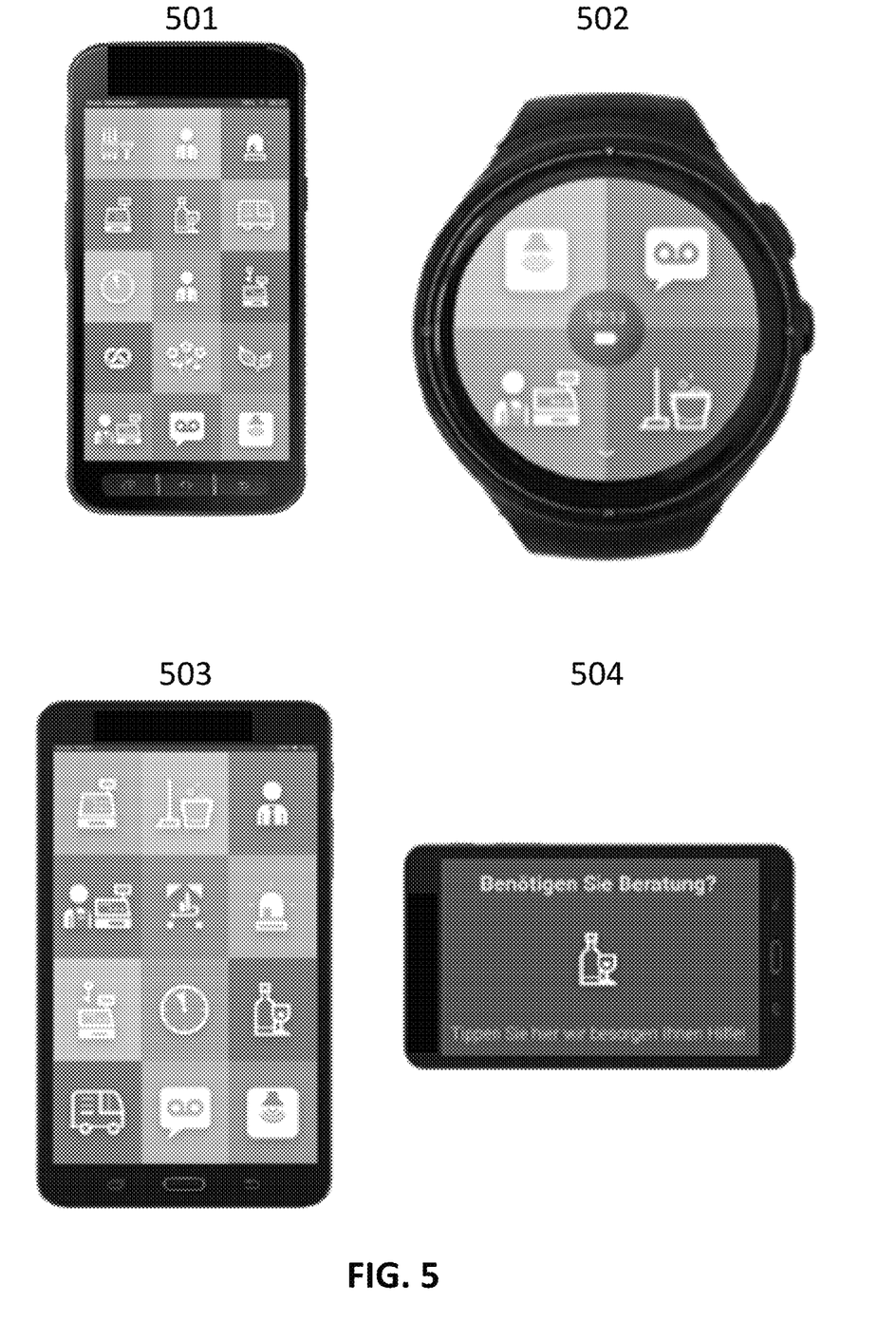
FIG. 5 shows a set of user devices that enable employees to communicate with each other, according to an embodiment.

FIG. 5 shows a set of user devices that enable employees to communicate with each other, according to an embodiment. The set of user device can operate using an operating system (e.g., Android™, Lollipop, Windows®, and/or the like). In some instances, a mobile phone 501 can be used among the set of user devices. The mobile phone 501 is often the first choice for many users/customers, as those devices usually have long battery life and good wireless local area network (WLAN) reception. A selection of actions (e.g., up to 15 actions) can be configured for display on the phone. A Communicator App software service (as described above with respect to FIG. 1) can be used in conjunction with other applications (e.g. session initiation protocol (SIP) client for telephony). A selection of actions (e.g. up to 4 actions) can be configured for display on the phone. In some instances, a smartwatch 502 can be used among the set of user devices. The smartwatch 502 is a lightweight, mobile device mounted on wrist. Compared to the mobile phone 501, the smartwatch 502 often has a lower battery life (e.g., 8 hours) and may not be ideal suitable for use in poorly lit WLAN environments. In some instances, a tablet 503 can be used among the set of user devices. The tablet 503 is often used in a checkout area, a service area, an information counters, and/or in a manager's office. A selection of actions (up to 12 actions) can be configured for display on the tablet 503. An application for software services can be always in "Always On" mode. In some instances, a service-tablet 504 can be used among the set of user devices. A service-tablet 504 using a communications app can allow a user to display only a single action triggered (e.g., by a peripheral device). Moreover, the service-tablet 504 can display the single action in a special configuration such as, for example, display a heading and a subheading about the action. The background color can also be configured differently for an action type on the service tablet 504.

In some implementations, before any user of a user device can log into a software service, the user device can be configured to prompt the user to enter credentials (e.g., username/password) or get registered. In some instances, a 10-digit code can be entered at the first start of the software service or scanned by a quick response (QR) Code. The QR code cannot be reused with other devices. Registration information of the user can include an IP address of a message broker for a location of the user device, information about the user device, and/or certificates for secure communication. After registration, the user can log into the software service using a personal user code (e.g., a 5-digit code).

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   receiving, from a peripheral device, a signal representing a first status of the peripheral device;
   identifying, using an artificial intelligence model, an action based on the first status of the peripheral device, each user from a subset of users being predesignated to perform the action, the artificial intelligence model trained using a training dataset that includes a set of indications of status of a set of peripheral devices, each indication of status from the set of indications of status associated with at least one action from a set of actions, the action requesting a plural number of users;
   sending, to a plurality of user devices, a signal representing the action, each user device from the plurality of user devices being uniquely associated with a user from the subset of users;
   facilitating a chat instance between the plurality of user devices to coordinate a response to the action, in response to identifying the action, and before receiving a signal representing an acceptance of the action;

causing the chat instance to be deleted from the plurality of user devices after the plural number of users has accepted the action;

receiving, from at least one user device from the plurality of user devices and after the facilitating of the chat instance, the signal representing the acceptance of the action in response to the signal representing the action;

sending, to each remaining user device from the plurality of user devices other than the at least one user device, a signal indicating the acceptance of the action by a different user device;

receiving, from the at least one user device, a signal indicating the action has been performed by the user; and sending, to the peripheral device, a signal that indicates the action has been performed and that causes the peripheral device to change the first status of the peripheral device to a second status of the peripheral device in response to receiving the signal that indicates the action has been performed.

2. The method of claim 1, wherein the subset of users is associated with a plurality of roles, the method further comprising:

associating one or more roles to each user from the subset of users based on a set of locations associated with the subset of users; and designating, before identifying the action, the subset of users to perform the action based on the one or more roles associated with each user from the subset of users.

3. The method of claim 1, wherein the sending the signal representing the action causes at least one of (a) playing an audio file in at least one location associated with at least one user from the subset of users, (b) sending a text to at least the subset of users, or (c) opening or closing a relay of the peripheral device.

4. The method of claim 1, wherein the peripheral device is at least one of a store peripheral device, a supermarket peripheral device, a cash register peripheral device, a reverse vending machine peripheral device, a security gate peripheral device, a self-checkout peripheral device, a cooling system monitoring peripheral device, a smart trashcan peripheral device, a shopping cart station peripheral device, an automatic door peripheral device, a backing oven peripheral device, a smart shelf peripheral device, a photo printing peripheral device, a cooling system peripheral device, or a cigarette holder peripheral device.

5. The method of claim 1, further comprising:

determining an audio zone for the peripheral device, the audio zone being associated with a playlist; and playing, via a speaker associated with the audio zone, the playlist at the audio zone.

6. The method of claim 1, wherein the peripheral device is included within a plurality of peripheral devices, the method further comprising:

controlling the plurality of peripheral devices via at least one signal interface, the at least one signal interface being at least one of: a wireless signal interface, a general-purpose input/output (GPIO) interface, a relay-based interface, or a radio interface.

7. The method of claim 1, wherein the artificial intelligence model includes at least one of a neural network or a decision tree.

8. An apparatus, comprising:
a memory; and
a processor, the processor operatively coupled to the memory and configured to:

send, from a user device to a content management server, a signal representing an indication of location of the user device, each user device from a plurality of user devices being uniquely associated with a user from a subset of users, the content management server associates one or more roles from a plurality of roles with the user in response to receiving the signal representing the indication of location of the user device;

receive, at the user device from the content management server, a signal representing an action, the action identified by the content management server using an artificial intelligence model and based on the status of a peripheral device by the peripheral device, the action associated with the one or more roles of the user device, the artificial intelligence model trained using a training dataset that includes a set of indications of status of a set of peripheral devices, each indication of status from the set of indications of status associated with at least one action from a set of actions, the action requesting a plural number of users;

display a chat instance between the subset of users to coordinate a response to the action, after receiving the signal representing the action, and before sending a signal representing an acceptance of the action;

send, from the user device to the content management server, the signal representing the acceptance of the action in response to the signal representing the action to cause the content management server to send, to each remaining user device from the plurality of user devices, a signal indicating the acceptance of the action by a different user device;

delete the chat instance after sending the signal representing the acceptance of the action and after the plural number of users have accepted the action; and send, from the user device to the content management server and after sending the signal representing the acceptance, a signal indicating the action has been performed by the user of the user device.

9. The apparatus of claim 8, wherein the receiving the signal representing the action causes at least one of (a) playing an audio file in at least one location associated with at least one user from the subset of users, (b) sending a text to at least the subset of users, or (c) opening or closing a relay of the peripheral device.

10. The apparatus of claim 8, wherein the peripheral device is at least one of a store peripheral device, a supermarket peripheral device, a cash register peripheral device, a reverse vending machine peripheral device, a security gate peripheral device, a self-checkout peripheral device, a cooling system monitoring peripheral device, a smart trashcan peripheral device, a shopping cart station peripheral device, an automatic door peripheral device, a backing oven peripheral device, a smart shelf peripheral device, a photo printing peripheral device, a cooling system peripheral device, or a cigarette holder peripheral device.

11. The apparatus of claim 8, wherein:
the user device is a first user device, and
the processor is configured to receive, at the first user device and from a second user device, a signal representing a rejection of the action in response to the signal representing the action, before sending the signal representing the acceptance of the action.

12. The apparatus of claim 8, wherein the chat instance is displayed via a graphical user interface (GUI) that includes a representation of an option to leave the chat instance.

13. A non-transitory processor-readable medium storing code representing instructions to be executed by a processor, the code comprising code to cause the processor to:

send, from a peripheral device to a content management server, a signal representing a first status of the peripheral device, to cause the content management server to:
identify an action based on the first status of the peripheral device, each user from a plurality of users being predesignated to perform the action,
send, to a plurality of user devices, a signal representing the action, each user device from the plurality of user devices being uniquely associated with a user from the plurality of users,
facilitate a chat instance between the plurality of user devices to coordinate a response to the action, after sending the signal representing the action, and before receiving a signal indicating the action has been accepted,
cause the chat instance to be deleted after a predetermined plural number of users have accepted the action, and
receive, from at least one user device from the plurality of user devices, a signal indicating the action has been performed by the user of the at least one user device;
receive, at the peripheral device and from the content management server, the signal indicating the action has been performed; and
change the first status of the peripheral device to a second status of the peripheral device, based on the signal indicating the action has been performed.

14. The non-transitory processor-readable medium of claim 13, the medium further comprising code to cause the processor to:
measure, at the peripheral device, a set of sensor values; and
identify, at the peripheral device, at least a first status of the peripheral device or a second status of the peripheral device based on the set of sensor values.

15. The non-transitory processor-readable medium of claim 14, wherein the set of sensor values include a first sensor value recorded at a first time and a second sensor value recorded at a second time after the first time.

16. The non-transitory processor-readable medium of claim 14, wherein:
the set of sensor values include a first sensor value recorded by a first type of sensor and a second sensor value recorded by a second type of sensor,
the first type of sensor and the second type of sensor each including at least one of an acoustic sensor, an optical sensor, a radio frequency (RF sensor), a magnetic sensor, a thermal sensor, a humidity sensor, a gyroscope, or an accelerometer.

17. The non-transitory processor-readable medium of claim 14, wherein the status of the peripheral device indicates a sensor value from the set of sensor values that is lower than a predetermined threshold.

18. The non-transitory processor-readable medium of claim 13, wherein the peripheral device is at least one of a store peripheral device, a supermarket peripheral device, a cash register peripheral device, a reverse vending machine peripheral device, a security gate peripheral device, a self-checkout peripheral device, a cooling system monitoring peripheral device, a smart trashcan peripheral device, a shopping cart station peripheral device, an automatic door peripheral device, a backing oven peripheral device, a smart shelf peripheral device, a photo printing peripheral device, a cooling system peripheral device, or a cigarette holder peripheral device.

19. The non-transitory processor-readable medium of claim 13, wherein the peripheral device is associated with an audio zone that is associated with a playlist determined by the content management server.

20. The non-transitory processor-readable medium of claim 13, wherein the peripheral device is included within a plurality of peripheral devices each of which is operatively coupled to the control management system via at least one of a wireless signal interface, a general-purpose input/output (GPIO) interface, a relay-based interface, or a radio interface.

21. The non-transitory processor-readable medium of claim 13, wherein the peripheral device operates at a first configuration based on the first status of the peripheral device, the medium further comprising code to cause the processor to:
operate, after receiving the signal indicating the action has been performed, the peripheral device at a second configuration based on the second status of the peripheral device.

* * * * *